US012641464B2

(12) United States Patent
Michalopoulos et al.

(10) Patent No.: US 12,641,464 B2
(45) Date of Patent: May 26, 2026

(54) APPARATUS AND METHODS FOR DOWNLINK POSITIONING

(71) Applicant: Nokia Technologies Oy, Espoo (FI)

(72) Inventors: Diomidis Michalopoulos, Munich (DE); Oana-Elena Barbu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 348 days.

(21) Appl. No.: 18/272,190

(22) PCT Filed: Jan. 13, 2021

(86) PCT No.: PCT/EP2021/050542
§ 371 (c)(1),
(2) Date: Jul. 13, 2023

(87) PCT Pub. No.: WO2022/152370
PCT Pub. Date: Jul. 21, 2022

(65) Prior Publication Data
US 2024/0073730 A1 Feb. 29, 2024

(51) Int. Cl.
*H04W 24/10* (2009.01)
*H04W 64/00* (2009.01)

(52) U.S. Cl.
CPC ........... *H04W 24/10* (2013.01); *H04W 64/00* (2013.01)

(58) Field of Classification Search
CPC ....... H04W 24/10; H04W 64/00; G01S 5/021; G01S 5/0036; G01S 5/0236
See application file for complete search history.

(56) References Cited

U.S. PATENT DOCUMENTS

| 2016/0135148 A1 | 5/2016 | Novian et al. | |
| 2017/0108579 A1* | 4/2017 | Irvine | G01S 5/08 |
| 2019/0208366 A1* | 7/2019 | Sosnin | G01S 13/876 |

(Continued)

FOREIGN PATENT DOCUMENTS

| EP | 3306337 A1 | 4/2018 |
| KR | 101986014 B1 | 6/2019 |

(Continued)

OTHER PUBLICATIONS

"3rd Generation Partnership Project; Technical Specification Group Radio Access Newark; LTE Positioning Prctocol (LPP) (Reiease 16)", 3GPP TS 37.355 V16.2.0, Sep. 2020, pp. 1-296.

(Continued)

*Primary Examiner* — Edan Orgad
*Assistant Examiner* — Samuel Roberge Bettendorf
(74) *Attorney, Agent, or Firm* — Barta Jones, PLLC

(57) ABSTRACT

The disclosure relates to an apparatus including at least one processor and at least one memory including computer code for one or more programs, the at least one memory and the computer code configured, with the at least one processor, to cause the apparatus at least to: receive a first reference signal from a first transmission point and a second reference signal from a second transmission point; determine a collinearity indicator for the first transmission point and the second transmission point based on a measurement of the first reference signal and a measurement of the second reference signal; and generate a measurement report based on the collinearity indicator.

7 Claims, 10 Drawing Sheets

(56) References Cited

U.S. PATENT DOCUMENTS

2020/0205197 A1\* 6/2020 Fodor ............... H04W 74/0816
2022/0140969 A1\* 5/2022 Cha ........................ G01S 5/011
                                                            455/452.1

FOREIGN PATENT DOCUMENTS

WO    WO 2015/145217 A1   10/2015
WO    WO 2020/067964 A1    4/2020

OTHER PUBLICATIONS

"New SID on NR Positioning Enhancements", 3GPP TSG RAN Meeting #86, RP-193237, Qualcomm Incorporated, 9.1.1, Dec. 9-12, 2019, 4 pages.
Langley, "Dilution of Precision", GPS World, May 1999, pp. 52-59.
Fischer, "Observed Time Difference of Arrival (OTDOA) Positioning in 3GPP LTE", Qualcomm Technologies Inc, Jun. 6, 2014, pp. 1-62.
Office action received for corresponding European Patent Application No. 21700551.1, dated May 7, 2025, 5 pages.

\* cited by examiner

800 UE may receive a first RS from a first TRP and a second RS from a second TRP

802 UE may determine a collinearity indicator for the first TRP and the second TRP based on a measurement of the first RS and a measurement of the second RS

804 UE may generate a measurement report based on the collinearity indicator

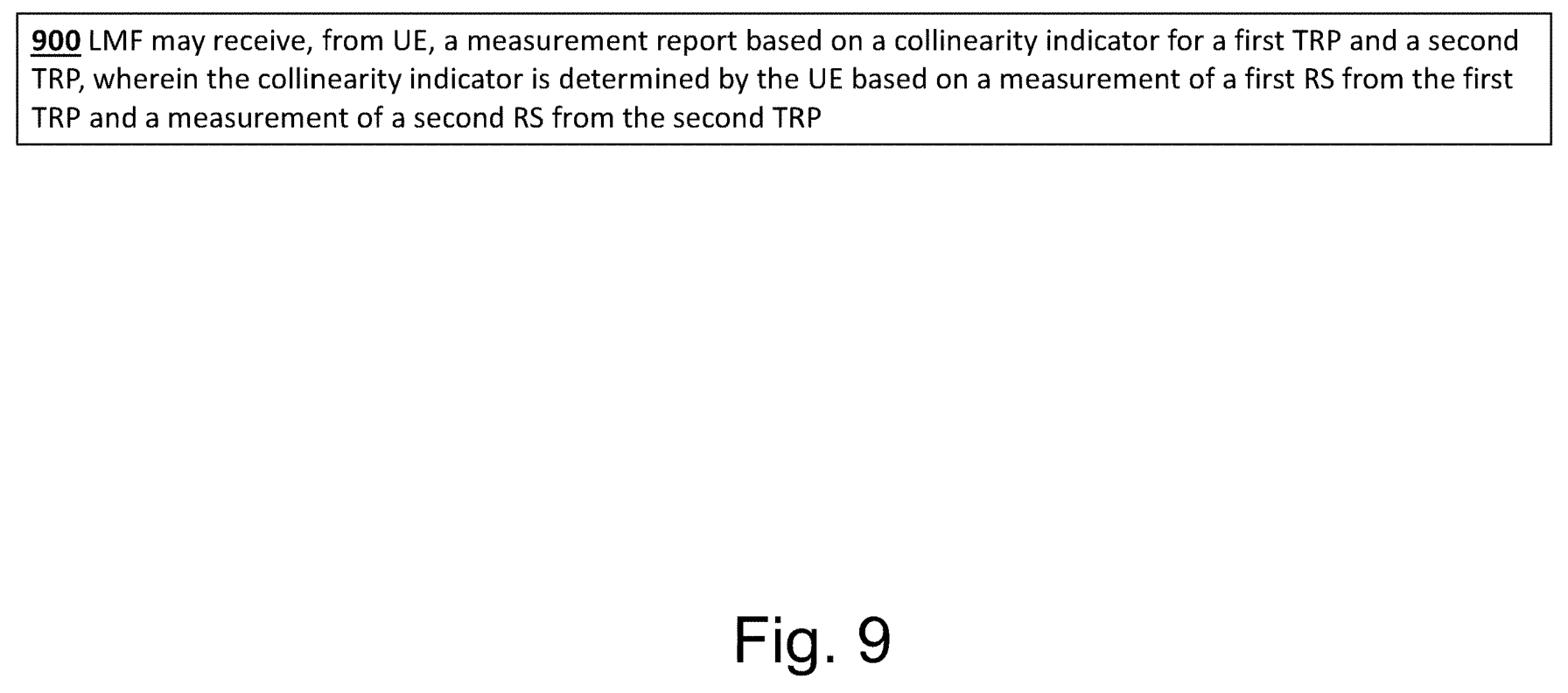

900 LMF may receive, from UE, a measurement report based on a collinearity indicator for a first TRP and a second TRP, wherein the collinearity indicator is determined by the UE based on a measurement of a first RS from the first TRP and a measurement of a second RS from the second TRP

Fig. 9

APPARATUS AND METHODS FOR DOWNLINK POSITIONING

CROSS REFERENCE TO RELATED APPLICATION

This patent application is a U.S. National Stage application of International Patent Application Number PCT/EP2021/050542 filed Jan. 13, 2021, which is hereby incorporated by reference in its entirety.

FIELD OF THE DISCLOSURE

The present disclosure relates to an apparatus, a method, and a computer program for generating a measurement report based on a collinearity indicator in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising means for: receiving a first reference signal from a first transmission point and a second reference signal from a second transmission point; determining a collinearity indicator for the first transmission point and the second transmission point based on a measurement of the first reference signal and a measurement of the second reference signal; and generating a measurement report based on the collinearity indicator.

The collinearity indicator may indicate one of a collinearity or a non-collinearity; or the collinearity indicator indicates one of a plurality of collinearity values.

Generating a measurement report based on the collinearity indicator may comprise: including a reference signal time difference based on the measurement of the first reference signal and the measurement of the second reference signal in the measurement report, when the collinearity indicator indicates a non-collinearity or a collinearity value lower than a threshold; and/or excluding a reference signal time difference based on the measurement of the first reference signal and the measurement of the second reference signal in the measurement report, when the collinearity indicator indicates a collinearity or a collinearity value greater than a threshold.

The apparatus may comprise means for: informing a network function that the reference signal time difference based on the measurement of the first reference signal and the measurement of the second reference signal has been excluded from the measurement report, when the collinearity indicator indicates a collinearity or a collinearity value greater than a threshold.

Generating a measurement report based on the collinearity indicator may comprise: including both the measurement of the first reference signal and the measurement of the second reference signal in the measurement report, when the collinearity indicator indicates a non-collinearity or a collinearity value lower than a threshold; and/or including both the measurement of the first reference signal and the measurement of the second reference signal in the measurement report, when the collinearity indicator indicates a collinearity or a collinearity value greater than a threshold.

Generating a measurement report based on the collinearity indicator may comprise: including the collinearity indicator in the measurement report, when the collinearity indicator indicates a non-collinearity or a collinearity value lower than a threshold; and/or including the collinearity indicator in the measurement report, when the collinearity indicator indicates a collinearity or a collinearity value greater than a threshold.

Determining a collinearity indicator for the first transmission point and the second transmission point based on a measurement of the first reference signal and a measurement of the second reference signal may comprise: determining a relative downlink angle of arrival of the first reference signal and the second reference signal based on the measurement of the first reference signal and the measurement of the second reference signal; comparing the relative downlink angle of arrival of the first reference signal and the second reference signal to at least one threshold; and determining the collinearity indicator for the first transmission point and the second transmission point based on the comparing.

The apparatus may comprise means for: receiving a collinearity detection configuration from a network function.

The apparatus may comprise means for: receiving the at least one threshold from a network function.

The at least one threshold may be a function of channel conditions.

The apparatus may comprise means for: receiving the first reference signal transmitted from the first transmission point via a first transmission beam and the second reference signal transmitted from the second transmission point via a second transmission beam; determining the collinearity indicator for the first transmission beam of the first transmission point and the second transmission beam of the second transmission point based on the measurement of the first reference signal and the measurement of the second reference signal; and generating the measurement report based on the collinearity indicator.

The apparatus may comprise means for: providing the measurement report to a network function.

The apparatus may be a terminal.

According to an aspect there is provided an apparatus comprising at least one processor and at least one memory including computer code for one or more programs, the at least one memory and the computer code configured, with the at least one processor, to cause the apparatus at least to: receive a first reference signal from a first transmission point and a second reference signal from a second transmission point; determine a collinearity indicator for the first transmission point and the second transmission point based on a measurement of the first reference signal and a measurement of the second reference signal; and generate a measurement report based on the collinearity indicator.

The collinearity indicator may indicate one of a collinearity or a non-collinearity; or the collinearity indicator indicates one of a plurality of collinearity values.

Generating a measurement report based on the collinearity indicator may comprise: including a reference signal time difference based on the measurement of the first reference signal and the measurement of the second reference signal in the measurement report, when the collinearity indicator indicates a non-collinearity or a collinearity value lower than a threshold; and/or excluding a reference signal time difference based on the measurement of the first reference signal and the measurement of the second reference signal in the measurement report, when the collinearity indicator indicates a collinearity or a collinearity value greater than a threshold.

The at least one memory and the computer code may be configured, with the at least one processor, to cause the apparatus at least to: inform a network function that the reference signal time difference based on the measurement of the first reference signal and the measurement of the second reference signal has been excluded from the measurement report, when the collinearity indicator indicates a collinearity or a collinearity value greater than a threshold.

Generating a measurement report based on the collinearity indicator may comprise: including both the measurement of the first reference signal and the measurement of the second reference signal in the measurement report, when the collinearity indicator indicates a non-collinearity or a collinearity value lower than a threshold; and/or including both the measurement of the first reference signal and the measurement of the second reference signal in the measurement report, when the collinearity indicator indicates a collinearity or a collinearity value greater than a threshold.

Generating a measurement report based on the collinearity indicator may comprise: including the collinearity indicator in the measurement report, when the collinearity indicator indicates a non-collinearity or a collinearity value lower than a threshold; and/or including the collinearity indicator in the measurement report, when the collinearity indicator indicates a collinearity or a collinearity value greater than a threshold.

Determining a collinearity indicator for the first transmission point and the second transmission point based on a measurement of the first reference signal and a measurement of the second reference signal may comprise: determining a relative downlink angle of arrival of the first reference signal and the second reference signal based on the measurement of the first reference signal and the measurement of the second reference signal; comparing the relative downlink angle of arrival of the first reference signal and the second reference signal to at least one threshold; and determining the collinearity indicator for the first transmission point and the second transmission point based on the comparing.

The at least one memory and the computer code may be configured, with the at least one processor, to cause the apparatus at least to: receive a collinearity detection configuration from a network function.

The at least one memory and the computer code may be configured, with the at least one processor, to cause the apparatus at least to: receive the at least one threshold from a network function.

The at least one threshold may be a function of channel conditions.

The at least one memory and the computer code may be configured, with the at least one processor, to cause the apparatus at least to: receive the first reference signal transmitted from the first transmission point via a first transmission beam and the second reference signal transmitted from the second transmission point via a second transmission beam; determine the collinearity indicator for the first transmission beam of the first transmission point and the second transmission beam of the second transmission point based on the measurement of the first reference signal and the measurement of the second reference signal; and generate the measurement report based on the collinearity indicator.

The at least one memory and the computer code may be configured, with the at least one processor, to cause the apparatus at least to: provide the measurement report to a network function.

The apparatus may be a terminal.

According to an aspect there is provided an apparatus comprising circuitry configured to: receive a first reference signal from a first transmission point and a second reference signal from a second transmission point; determine a collinearity indicator for the first transmission point and the second transmission point based on a measurement of the first reference signal and a measurement of the second reference signal; and generate a measurement report based on the collinearity indicator.

The collinearity indicator may indicate one of a collinearity or a non-collinearity; or the collinearity indicator indicates one of a plurality of collinearity values.

Generating a measurement report based on the collinearity indicator may comprise: including a reference signal time difference based on the measurement of the first reference signal and the measurement of the second reference signal in the measurement report, when the collinearity indicator indicates a non-collinearity or a collinearity value lower than a threshold; and/or excluding a reference signal time difference based on the measurement of the first reference signal and the measurement of the second reference signal in the measurement report, when the collinearity indicator indicates a collinearity or a collinearity value greater than a threshold.

The apparatus may comprise circuitry configured to: inform a network function that the reference signal time difference based on the measurement of the first reference signal and the measurement of the second reference signal has been excluded from the measurement report, when the collinearity indicator indicates a collinearity or a collinearity value greater than a threshold.

Generating a measurement report based on the collinearity indicator may comprise: including both the measurement of the first reference signal and the measurement of the second reference signal in the measurement report, when the collinearity indicator indicates a non-collinearity or a collinearity value lower than a threshold; and/or including both the measurement of the first reference signal and the measurement of the second reference signal in the measurement report, when the collinearity indicator indicates a collinearity or a collinearity value greater than a threshold.

Generating a measurement report based on the collinearity indicator may comprise: including the collinearity indicator in the measurement report, when the collinearity indicator indicates a non-collinearity or a collinearity value lower than a threshold; and/or including the collinearity indicator in the measurement report, when the collinearity indicator indicates a collinearity or a collinearity value greater than a threshold.

Determining a collinearity indicator for the first transmission point and the second transmission point based on a measurement of the first reference signal and a measurement of the second reference signal may comprise: determining a relative downlink angle of arrival of the first reference signal and the second reference signal based on the measurement of the first reference signal and the measurement of the second reference signal; comparing the relative downlink angle of arrival of the first reference signal and the second reference signal to at least one threshold; and determining the collinearity indicator for the first transmission point and the second transmission point based on the comparing.

The apparatus may comprise circuitry configured to: receive a collinearity detection configuration from a network function.

The apparatus may comprise circuitry configured to: receive the at least one threshold from a network function.

The at least one threshold may be a function of channel conditions.

The apparatus may comprise circuitry configured to: receive the first reference signal transmitted from the first transmission point via a first transmission beam and the second reference signal transmitted from the second transmission point via a second transmission beam; determine the collinearity indicator for the first transmission beam of the first transmission point and the second transmission beam of the second transmission point based on the measurement of the first reference signal and the measurement of the second reference signal; and generate the measurement report based on the collinearity indicator.

The apparatus may comprise circuitry configured to: provide the measurement report to a network function.

The apparatus may be a terminal.

According to an aspect there is provided a method comprising: receiving a first reference signal from a first transmission point and a second reference signal from a second transmission point; determining a collinearity indicator for the first transmission point and the second transmission point based on a measurement of the first reference signal and a measurement of the second reference signal; and generating a measurement report based on the collinearity indicator.

The collinearity indicator may indicate one of a collinearity or a non-collinearity; or the collinearity indicator indicates one of a plurality of collinearity values.

Generating a measurement report based on the collinearity indicator may comprise: including a reference signal time difference based on the measurement of the first reference signal and the measurement of the second reference signal in the measurement report, when the collinearity indicator indicates a non-collinearity or a collinearity value lower than a threshold; and/or excluding a reference signal time difference based on the measurement of the first reference signal and the measurement of the second reference signal in the measurement report, when the collinearity indicator indicates a collinearity or a collinearity value greater than a threshold.

The method may comprise: informing a network function that the reference signal time difference based on the measurement of the first reference signal and the measurement of the second reference signal has been excluded from the measurement report, when the collinearity indicator indicates a collinearity or a collinearity value greater than a threshold.

Generating a measurement report based on the collinearity indicator may comprise: including both the measurement of the first reference signal and the measurement of the second reference signal in the measurement report, when the collinearity indicator indicates a non-collinearity or a collinearity value lower than a threshold; and/or including both the measurement of the first reference signal and the measurement of the second reference signal in the measurement report, when the collinearity indicator indicates a collinearity or a collinearity value greater than a threshold.

Generating a measurement report based on the collinearity indicator may comprise: including the collinearity indicator in the measurement report, when the collinearity indicator indicates a non-collinearity or a collinearity value lower than a threshold; and/or including the collinearity indicator in the measurement report, when the collinearity indicator indicates a collinearity or a collinearity value greater than a threshold.

Determining a collinearity indicator for the first transmission point and the second transmission point based on a measurement of the first reference signal and a measurement of the second reference signal may comprise: determining a relative downlink angle of arrival of the first reference signal and the second reference signal based on the measurement of the first reference signal and the measurement of the second reference signal; comparing the relative downlink angle of arrival of the first reference signal and the second reference signal to at least one threshold; and determining the collinearity indicator for the first transmission point and the second transmission point based on the comparing.

The method may comprise: receiving a collinearity detection configuration from a network function.

The method may comprise: receiving the at least one threshold from a network function.

The at least one threshold may be a function of channel conditions.

The apparatus may comprise means for: receiving the first reference signal transmitted from the first transmission point via a first transmission beam and the second reference signal transmitted from the second transmission point via a second transmission beam; determining the collinearity indicator for the first transmission beam of the first transmission point and the second transmission beam of the second transmission point based on the measurement of the first reference signal and the measurement of the second reference signal; and generating the measurement report based on the collinearity indicator.

The method may comprise: providing the measurement report to a network function.

The method may be performed by a terminal.

According to an aspect there is provided a computer program comprising computer executable code which when run on at least one processor is configured to: receive a first reference signal from a first transmission point and a second reference signal from a second transmission point; determine a collinearity indicator for the first transmission point and the second transmission point based on a measurement of the first reference signal and a measurement of the second reference signal; and generate a measurement report based on the collinearity indicator.

The collinearity indicator may indicate one of a collinearity or a non-collinearity; or the collinearity indicator indicates one of a plurality of collinearity values.

Generating a measurement report based on the collinearity indicator may comprise: including a reference signal time difference based on the measurement of the first reference signal and the measurement of the second reference signal in the measurement report, when the collinearity indicator indicates a non-collinearity or a collinearity value lower than a threshold; and/or excluding a reference signal time difference based on the measurement of the first reference signal and the measurement of the second reference signal in the measurement report, when the collinearity indicator indicates a collinearity or a collinearity value greater than a threshold.

The computer program may comprise computer executable code which when run on at least one processor is configured to: inform a network function that the reference signal time difference based on the measurement of the first reference signal and the measurement of the second reference signal has been excluded from the measurement report, when the collinearity indicator indicates a collinearity or a collinearity value greater than a threshold.

Generating a measurement report based on the collinearity indicator may comprise: including both the measurement of the first reference signal and the measurement of the second reference signal in the measurement report, when the collinearity indicator indicates a non-collinearity or a collinearity value lower than a threshold; and/or including both the measurement of the first reference signal and the measurement of the second reference signal in the measurement report, when the collinearity indicator indicates a collinearity or a collinearity value greater than a threshold.

Generating a measurement report based on the collinearity indicator may comprise: including the collinearity indicator in the measurement report, when the collinearity indicator indicates a non-collinearity or a collinearity value lower than a threshold; and/or including the collinearity indicator in the measurement report, when the collinearity indicator indicates a collinearity or a collinearity value greater than a threshold.

Determining a collinearity indicator for the first transmission point and the second transmission point based on a measurement of the first reference signal and a measurement of the second reference signal may comprise: determining a relative downlink angle of arrival of the first reference signal and the second reference signal based on the measurement of the first reference signal and the measurement of the second reference signal; comparing the relative downlink angle of arrival of the first reference signal and the second reference signal to at least one threshold; and determining the collinearity indicator for the first transmission point and the second transmission point based on the comparing.

The computer program may comprise computer executable code which when run on at least one processor is configured to: receive a collinearity detection configuration from a network function.

The computer program may comprise computer executable code which when run on at least one processor is configured to: receive the at least one threshold from a network function.

The at least one threshold may be a function of channel conditions.

The computer program may comprise computer executable code which when run on at least one processor is configured to: receive the first reference signal transmitted from the first transmission point via a first transmission beam and the second reference signal transmitted from the second transmission point via a second transmission beam; determine the collinearity indicator for the first transmission beam of the first transmission point and the second transmission beam of the second transmission point based on the measurement of the first reference signal and the measurement of the second reference signal; and generate the measurement report based on the collinearity indicator.

The computer program may comprise computer executable code which when run on at least one processor is configured to: provide the measurement report to a network function.

The at least one processor may be part of a terminal.

According to an aspect there is provided an apparatus comprising means for: receiving, from a terminal, a measurement report based on a collinearity indicator for a first transmission point and a second transmission point, wherein the collinearity indicator is determined by the terminal based on a measurement of a first reference signal from the first transmission point and a measurement of a second reference signal from the second transmission point.

The collinearity indicator may indicate one of a collinearity or a non-collinearity; or the collinearity indicator may indicate one of a plurality of collinearity values.

The measurement report may include a reference signal time difference based on the measurement of the first reference signal and the measurement of the second reference signal, when the collinearity indicator indicates a non-collinearity or a collinearity value lower than a threshold; and/or the measurement report may exclude a reference signal time difference based on the measurement of the first reference signal and the measurement of the second reference signal in the measurement report, when the collinearity indicator indicates a collinearity or a collinearity value greater than a threshold.

The apparatus may comprise means for: being informed, by the terminal, that the reference signal time difference based on the measurement of the first reference signal and the measurement of the second reference signal has been excluded from the measurement report, when the collinearity indicator indicates a collinearity or a value greater than a threshold.

The measurement report may include both the measurement of the first reference signal and the measurement of the second reference signal, when the collinearity indicator indicates a non-collinearity or a collinearity value lower than a threshold; and/or the measurement report may include both the measurement of the first reference signal and the measurement of the second reference signal in the measurement report, when the collinearity indicator indicates a collinearity or a collinearity value greater than a threshold.

The measurement report may include the collinearity indicator in, when the collinearity indicator indicates a non-collinearity or a value lower than a threshold; and/or the measurement report may include the collinearity indicator, when the collinearity indicator indicates a collinearity or a collinearity value greater than a threshold.

The apparatus may comprise means for: providing, to the terminal, a collinearity detection configuration.

The apparatus may comprise means for: providing, to the terminal, at least one threshold to determine the collinearity indicator.

The at least one threshold may be a function of channel conditions.

The apparatus may comprise means for: determining a position of the terminal based on the measurement report.

Determining a position of the terminal based on the measurement report may comprise: determining a position of the terminal based on the reference signal time difference based on the measurement of the first reference signal and the measurement of the second reference signal.

Determining a position of the terminal based on the measurement report may comprises: determining an angle of departure for the first transmission point and an angle of departure for the second transmission point, when the collinearity indicator indicates a non-collinearity a collinearity value lower than a threshold; determining an angle of departure for the first transmission point, when the collinearity indicator indicates a collinearity or a collinearity value greater than a threshold and the measurement of the first reference signal is indicated as the strongest measurement in the measurement report; and/or determining an angle of departure for the second transmission point, when the collinearity indicator indicates a collinearity or a collinearity value greater than a threshold and the measurement of the second reference signal is indicated as the strongest measurement in the measurement report.

Determining a position of the terminal based on the measurement report may comprise: determining a position of the terminal based on the angle of departure for the first transmission point and/or the angle of departure for the second transmission point.

The apparatus may comprise means for: receiving, from the terminal, the measurement report based on a collinearity indicator for a first transmission beam of a first transmission point and a second transmission beam of a second transmission point, wherein the collinearity indicator is determined by the terminal based on a measurement of the first reference signal transmitted by the first transmission point via the first transmission beam and a measurement of the second reference signal transmitted by the second transmission point via the second transmission beam.

The apparatus may comprise means for: providing, to the first transmission point and/or the second transmission point, the collinearity indicator to cause the first transmission point to adjust the first transmission beam and/or the second transmission point to adjust the second transmission beam.

The apparatus may be a network function.

The apparatus may be a location management function.

According to an aspect there is provided an apparatus comprising at least one processor and at least one memory including computer code for one or more programs, the at least one memory and the computer code configured, with the at least one processor, to cause the apparatus at least to: receive, from a terminal, a measurement report based on a collinearity indicator for a first transmission point and a second transmission point, wherein the collinearity indicator is determined by the terminal based on a measurement of a first reference signal from the first transmission point and a measurement of a second reference signal from the second transmission point.

The collinearity indicator may indicate one of a collinearity or a non-collinearity; or the collinearity indicator may indicate one of a plurality of collinearity values.

The measurement report may include a reference signal time difference based on the measurement of the first reference signal and the measurement of the second reference signal, when the collinearity indicator indicates a non-collinearity or a collinearity value lower than a threshold; and/or the measurement report may exclude a reference signal time difference based on the measurement of the first reference signal and the measurement of the second reference signal in the measurement report, when the collinearity indicator indicates a collinearity or a collinearity value greater than a threshold.

The at least one memory and the computer code may be configured, with the at least one processor, to cause the apparatus at least to: be informed, by the terminal, that the reference signal time difference based on the measurement of the first reference signal and the measurement of the second reference signal has been excluded from the measurement report, when the collinearity indicator indicates a collinearity or a value greater than a threshold.

The measurement report may include both the measurement of the first reference signal and the measurement of the second reference signal, when the collinearity indicator indicates a non-collinearity or a collinearity value lower than a threshold; and/or the measurement report may include both the measurement of the first reference signal and the measurement of the second reference signal in the measurement report, when the collinearity indicator indicates a collinearity or a collinearity value greater than a threshold.

The measurement report may include the collinearity indicator in, when the collinearity indicator indicates a non-collinearity or a value lower than a threshold; and/or the measurement report may include the collinearity indicator, when the collinearity indicator indicates a collinearity or a collinearity value greater than a threshold.

The at least one memory and the computer code may be configured, with the at least one processor, to cause the apparatus at least to: provide, to the terminal, a collinearity detection configuration.

The at least one memory and the computer code may be configured, with the at least one processor, to cause the apparatus at least to: provide, to the terminal, at least one threshold to determine the collinearity indicator.

The at least one threshold may be a function of channel conditions.

The at least one memory and the computer code may be configured, with the at least one processor, to cause the apparatus at least to: determine a position of the terminal based on the measurement report.

Determining a position of the terminal based on the measurement report may comprise: determining a position of the terminal based on the reference signal time difference based on the measurement of the first reference signal and the measurement of the second reference signal.

Determining a position of the terminal based on the measurement report may comprises: determining an angle of departure for the first transmission point and an angle of departure for the second transmission point, when the collinearity indicator indicates a non-collinearity a collinearity value lower than a threshold; determining an angle of departure for the first transmission point, when the collinearity indicator indicates a collinearity or a collinearity value greater than a threshold and the measurement of the first reference signal is indicated as the strongest measurement in the measurement report; and/or determining an angle of departure for the second transmission point, when the collinearity indicator indicates a collinearity or a collinearity value greater than a threshold and the measurement of the second reference signal is indicated as the strongest measurement in the measurement report.

Determining a position of the terminal based on the measurement report may comprise: determining a position of the terminal based on the angle of departure for the first transmission point and/or the angle of departure for the second transmission point.

The at least one memory and the computer code may be configured, with the at least one processor, to cause the apparatus at least to: receive, from the terminal, the measurement report based on a collinearity indicator for a first transmission beam of a first transmission point and a second transmission beam of a second transmission point, wherein the collinearity indicator is determined by the terminal based on a measurement of the first reference signal transmitted by the first transmission point via the first transmission beam and a measurement of the second reference signal transmitted by the second transmission point via the second transmission beam.

The at least one memory and the computer code may be configured, with the at least one processor, to cause the apparatus at least to: provide, to the first transmission point and/or the second transmission point, the collinearity indicator to cause the first transmission point to adjust the first transmission beam and/or the second transmission point to adjust the second transmission beam.

The apparatus may be a network function.

The apparatus may be a location management function.

According to an aspect there is provided an apparatus comprising circuitry configured to: receive, from a terminal, a measurement report based on a collinearity indicator for a first transmission point and a second transmission point, wherein the collinearity indicator is determined by the terminal based on a measurement of a first reference signal from the first transmission point and a measurement of a second reference signal from the second transmission point.

The collinearity indicator may indicate one of a collinearity or a non-collinearity; or the collinearity indicator may indicate one of a plurality of collinearity values.

The measurement report may include a reference signal time difference based on the measurement of the first reference signal and the measurement of the second reference signal, when the collinearity indicator indicates a non-collinearity or a collinearity value lower than a threshold; and/or the measurement report may exclude a reference signal time difference based on the measurement of the first reference signal and the measurement of the second reference signal in the measurement report, when the collinearity indicator indicates a collinearity or a collinearity value greater than a threshold.

The apparatus may comprise circuitry configured to: be informed, by the terminal, that the reference signal time difference based on the measurement of the first reference signal and the measurement of the second reference signal has been excluded from the measurement report, when the collinearity indicator indicates a collinearity or a value greater than a threshold.

The measurement report may include both the measurement of the first reference signal and the measurement of the second reference signal, when the collinearity indicator indicates a non-collinearity or a collinearity value lower than a threshold; and/or the measurement report may include both the measurement of the first reference signal and the measurement of the second reference signal in the measurement report, when the collinearity indicator indicates a collinearity or a collinearity value greater than a threshold.

The measurement report may include the collinearity indicator in, when the collinearity indicator indicates a non-collinearity or a value lower than a threshold; and/or the measurement report may include the collinearity indicator, when the collinearity indicator indicates a collinearity or a collinearity value greater than a threshold.

The apparatus may comprise circuitry configured to: provide, to the terminal, a collinearity detection configuration.

The apparatus may comprise circuitry configured to: provide, to the terminal, at least one threshold to determine the collinearity indicator.

The at least one threshold may be a function of channel conditions.

The apparatus may comprise circuitry configured to: determine a position of the terminal based on the measurement report.

Determining a position of the terminal based on the measurement report may comprise: determining a position of the terminal based on the reference signal time difference based on the measurement of the first reference signal and the measurement of the second reference signal.

Determining a position of the terminal based on the measurement report may comprises: determining an angle of departure for the first transmission point and an angle of departure for the second transmission point, when the collinearity indicator indicates a non-collinearity a collinearity value lower than a threshold; determining an angle of departure for the first transmission point, when the collinearity indicator indicates a collinearity or a collinearity value greater than a threshold and the measurement of the first reference signal is indicated as the strongest measurement in the measurement report; and/or determining an angle of departure for the second transmission point, when the collinearity indicator indicates a collinearity or a collinearity value greater than a threshold and the measurement of the second reference signal is indicated as the strongest measurement in the measurement report.

Determining a position of the terminal based on the measurement report may comprise: determining a position of the terminal based on the angle of departure for the first transmission point and/or the angle of departure for the second transmission point.

The apparatus may comprise circuitry configured to: receive, from the terminal, the measurement report based on a collinearity indicator for a first transmission beam of a first transmission point and a second transmission beam of a second transmission point, wherein the collinearity indicator is determined by the terminal based on a measurement of the first reference signal transmitted by the first transmission point via the first transmission beam and a measurement of the second reference signal transmitted by the second transmission point via the second transmission beam.

The apparatus may comprise circuitry configured to: provide, to the first transmission point and/or the second transmission point, the collinearity indicator to cause the first transmission point to adjust the first transmission beam and/or the second transmission point to adjust the second transmission beam.

The apparatus may be a network function.

The apparatus may be a location management function.

According to an aspect there is provided a method comprising: receiving, from a terminal, a measurement report based on a collinearity indicator for a first transmission point and a second transmission point, wherein the collinearity indicator is determined by the terminal based on a measurement of a first reference signal from the first transmission point and a measurement of a second reference signal from the second transmission point.

The collinearity indicator may indicate one of a collinearity or a non-collinearity; or the collinearity indicator may indicate one of a plurality of collinearity values.

The measurement report may include a reference signal time difference based on the measurement of the first reference signal and the measurement of the second reference signal, when the collinearity indicator indicates a non-collinearity or a collinearity value lower than a threshold; and/or the measurement report may exclude a reference signal time difference based on the measurement of the first reference signal and the measurement of the second reference signal in the measurement report, when the collinearity indicator indicates a collinearity or a collinearity value greater than a threshold.

The method may comprise: being informed, by the terminal, that the reference signal time difference based on the measurement of the first reference signal and the measurement of the second reference signal has been excluded from the measurement report, when the collinearity indicator indicates a collinearity or a value greater than a threshold.

The measurement report may include both the measurement of the first reference signal and the measurement of the second reference signal, when the collinearity indicator indicates a non-collinearity or a collinearity value lower than a threshold; and/or the measurement report may include both the measurement of the first reference signal and the measurement of the second reference signal in the measurement report, when the collinearity indicator indicates a collinearity or a collinearity value greater than a threshold.

The measurement report may include the collinearity indicator in, when the collinearity indicator indicates a non-collinearity or a value lower than a threshold; and/or the measurement report may include the collinearity indicator, when the collinearity indicator indicates a collinearity or a collinearity value greater than a threshold.

The method may comprise: providing, to the terminal, a collinearity detection configuration.

The method may comprise: providing, to the terminal, at least one threshold to determine the collinearity indicator.

The at least one threshold may be a function of channel conditions.

The method may comprise: determining a position of the terminal based on the measurement report.

Determining a position of the terminal based on the measurement report may comprise: determining a position of the terminal based on the reference signal time difference based on the measurement of the first reference signal and the measurement of the second reference signal.

Determining a position of the terminal based on the measurement report may comprises: determining an angle of departure for the first transmission point and an angle of departure for the second transmission point, when the collinearity indicator indicates a non-collinearity a collinearity value lower than a threshold; determining an angle of departure for the first transmission point, when the collinearity indicator indicates a collinearity or a collinearity value greater than a threshold and the measurement of the first reference signal is indicated as the strongest measurement in the measurement report; and/or determining an angle of departure for the second transmission point, when the collinearity indicator indicates a collinearity or a collinearity value greater than a threshold and the measurement of the second reference signal is indicated as the strongest measurement in the measurement report.

Determining a position of the terminal based on the measurement report may comprise: determining a position of the terminal based on the angle of departure for the first transmission point and/or the angle of departure for the second transmission point.

The method may comprise: receiving, from the terminal, the measurement report based on a collinearity indicator for a first transmission beam of a first transmission point and a second transmission beam of a second transmission point, wherein the collinearity indicator is determined by the terminal based on a measurement of the first reference signal transmitted by the first transmission point via the first transmission beam and a measurement of the second reference signal transmitted by the second transmission point via the second transmission beam.

The method may comprise: providing, to the first transmission point and/or the second transmission point, the collinearity indicator to cause the first transmission point to adjust the first transmission beam and/or the second transmission point to adjust the second transmission beam.

The method may be performed by a network function.

The method may be performed by a location management function.

According to an aspect there is provided a computer program comprising computer executable code which when run on at least one processor is configured to: receive, from a terminal, a measurement report based on a collinearity indicator for a first transmission point and a second transmission point, wherein the collinearity indicator is determined by the terminal based on a measurement of a first reference signal from the first transmission point and a measurement of a second reference signal from the second transmission point.

The collinearity indicator may indicate one of a collinearity or a non-collinearity; or the collinearity indicator may indicate one of a plurality of collinearity values.

The measurement report may include a reference signal time difference based on the measurement of the first reference signal and the measurement of the second reference signal, when the collinearity indicator indicates a non-collinearity or a collinearity value lower than a threshold; and/or the measurement report may exclude a reference signal time difference based on the measurement of the first reference signal and the measurement of the second reference signal in the measurement report, when the collinearity indicator indicates a collinearity or a collinearity value greater than a threshold.

The computer program may comprise computer executable code which when run on at least one processor is configured to: be informed, by the terminal, that the reference signal time difference based on the measurement of the first reference signal and the measurement of the second reference signal has been excluded from the measurement report, when the collinearity indicator indicates a collinearity or a value greater than a threshold.

The measurement report may include both the measurement of the first reference signal and the measurement of the second reference signal, when the collinearity indicator indicates a non-collinearity or a collinearity value lower than a threshold; and/or the measurement report may include both the measurement of the first reference signal and the measurement of the second reference signal in the measurement report, when the collinearity indicator indicates a collinearity or a collinearity value greater than a threshold.

The measurement report may include the collinearity indicator in, when the collinearity indicator indicates a non-collinearity or a value lower than a threshold; and/or the measurement report may include the collinearity indicator, when the collinearity indicator indicates a collinearity or a collinearity value greater than a threshold.

The computer program may comprise computer executable code which when run on at least one processor is configured to: provide, to the terminal, a collinearity detection configuration.

The computer program may comprise computer executable code which when run on at least one processor is configured to: provide, to the terminal, at least one threshold to determine the collinearity indicator.

The at least one threshold may be a function of channel conditions.

The computer program may comprise computer executable code which when run on at least one processor is configured to: determine a position of the terminal based on the measurement report.

Determining a position of the terminal based on the measurement report may comprise: determining a position of the terminal based on the reference signal time difference based on the measurement of the first reference signal and the measurement of the second reference signal.

Determining a position of the terminal based on the measurement report may comprises: determining an angle of departure for the first transmission point and an angle of departure for the second transmission point, when the collinearity indicator indicates a non-collinearity a collinearity value lower than a threshold; determining an angle of departure for the first transmission point, when the collinearity indicator indicates a collinearity or a collinearity value greater than a threshold and the measurement of the first reference signal is indicated as the strongest measurement in the measurement report; and/or determining an angle of departure for the second transmission point, when the collinearity indicator indicates a collinearity or a collinearity value greater than a threshold and the measurement of the second reference signal is indicated as the strongest measurement in the measurement report.

Determining a position of the terminal based on the measurement report may comprise: determining a position of the terminal based on the angle of departure for the first transmission point and/or the angle of departure for the second transmission point.

The computer program may comprise computer executable code which when run on at least one processor is configured to: receive, from the terminal, the measurement report based on a collinearity indicator for a first transmission beam of a first transmission point and a second transmission beam of a second transmission point, wherein the collinearity indicator is determined by the terminal based on a measurement of the first reference signal transmitted by the first transmission point via the first transmission beam and a measurement of the second reference signal transmitted by the second transmission point via the second transmission beam.

The computer program may comprise computer executable code which when run on at least one processor is configured to: provide, to the first transmission point and/or the second transmission point, the collinearity indicator to cause the first transmission point to adjust the first transmission beam and/or the second transmission point to adjust the second transmission beam.

The at least one processor may be part of a network function.

The at least one processor may be part of a location management function.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access Management Function
AoA: Angle of Arrival
AoD: Angle of Departure
API: Application Protocol Interface
BS: Base Station
CR: Collinearity Region
CU: Centralized Unit
DL: Downlink
DL-AoD: Downlink Angle of Departure
DL-TDoA: Downlink Time Difference of Arrival
DU: Distributed Unit
GDoP: Geometric Dilution of Precision
gNB: gNodeB
GSM: Global System for Mobile communication
HSS: Home Subscriber Server
IoT: Internet of Things
LCS: Location Service
LMF: Location Management Function
LTE: Long Term Evolution
MAC: Medium Access Control
MS: Mobile Station
MTC: Machine Type Communication
NEF: Network Exposure Function
NF: Network Function
NR: New radio
NRF: Network function Repository Function
PDU: Packet Data Unit
PRS: Positioning Reference Signal
RAM: Random Access Memory
(R)AN: (Radio) Access Network
ROM: Read Only Memory
RSRP: Reference Signal Received Power
RSTD: Reference Signal Time Difference
SINR: Signal to interference plus noise ratio
SMF: Session Management Function
NSSAI: Network Slice Selection Assistance Information
ToA: Time of Arrival
TR: Technical Report
TRP: Transmission Point
TS: Technical Specification UE: User Equipment
UMTS: Universal Mobile Telecommunication System
3GPP: 3$^{rd}$ Generation Partnership Project
5G: 5$^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 9 shows a block diagram of a method for receiving a measurement report based on a collinearity indicator performed, for example, by a network function.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
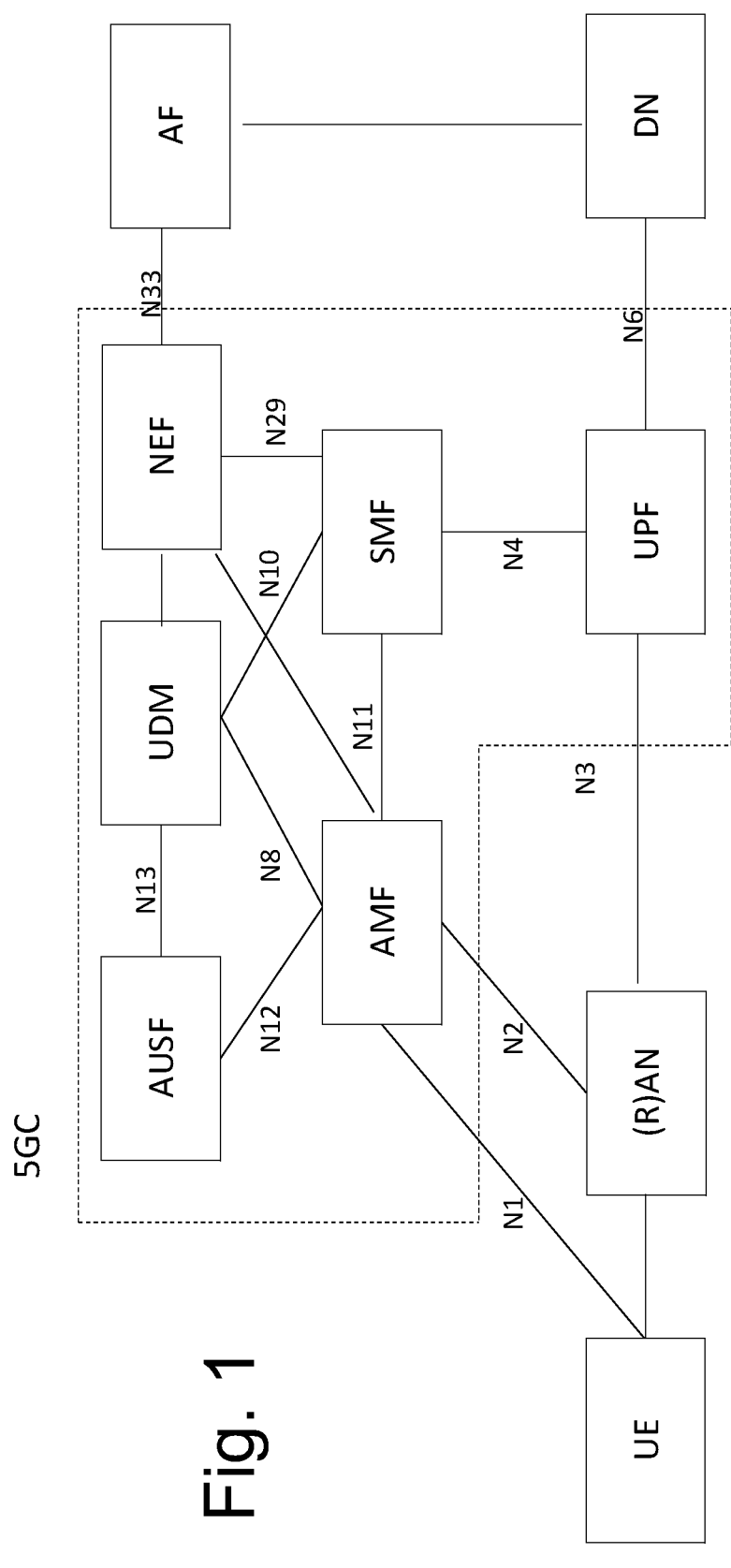
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions. A base station, such as gNodeB, may more generically be referred as transmission points (TRP).

The 5GC may comprise an access management function (AMF), a session management function (SMF), an authentication server function (AUSF), a user data management (UDM), a user plane function (UPF) and/or a network exposure function (NEF). Although not illustrated the 5GC may comprise other network functions (NF), such as a location management function (LMF).

Figure 2:
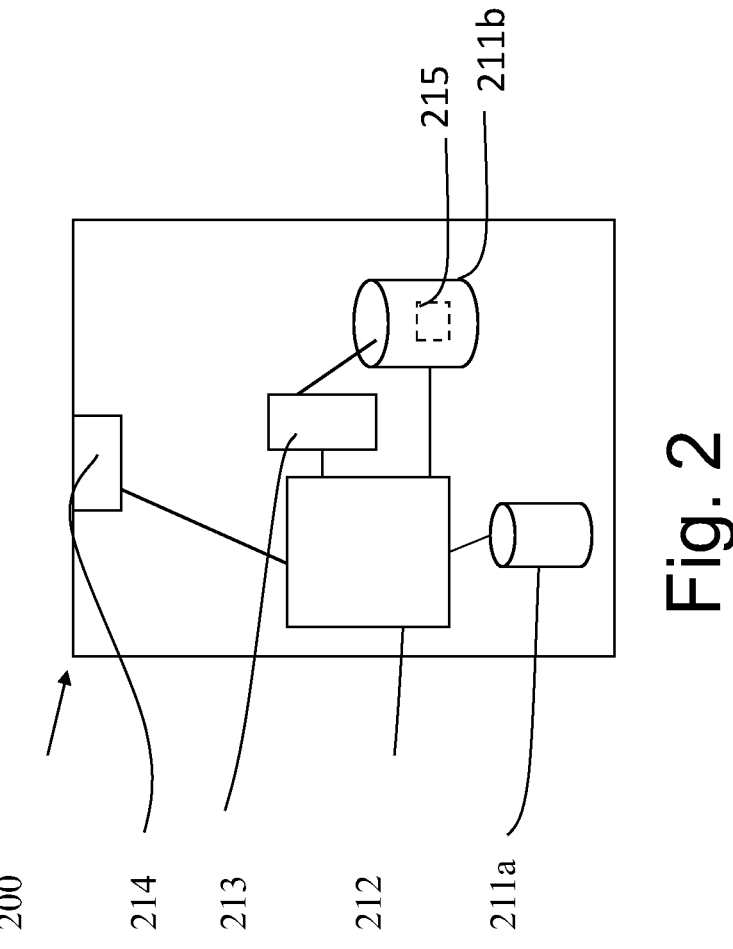
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
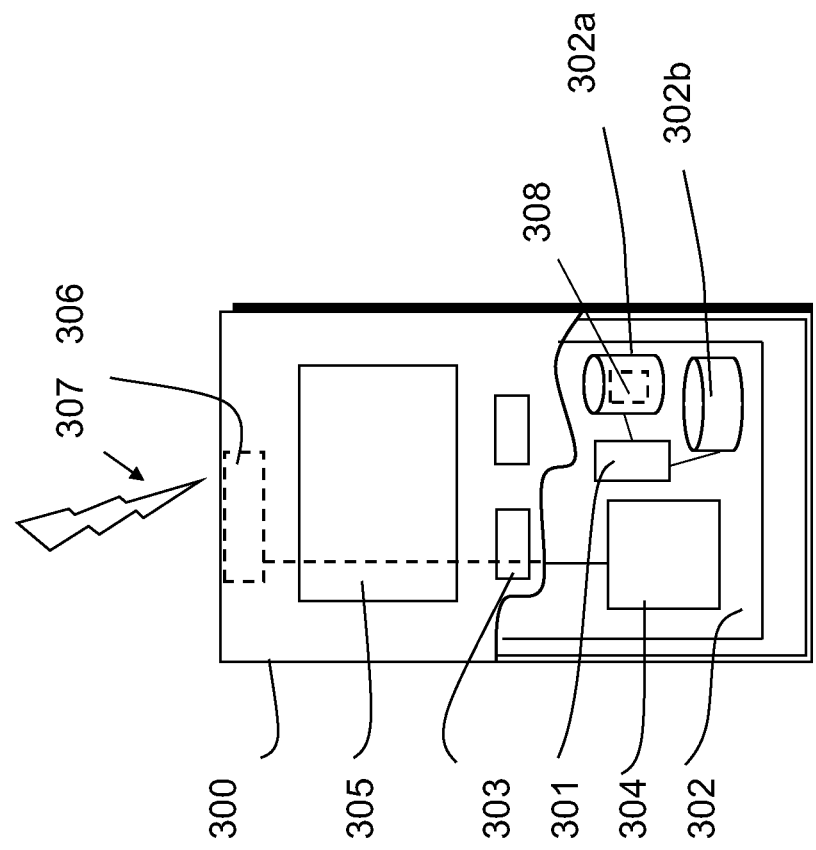
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspects of this disclosure relate to downlink positioning. In downlink positioning the position (i.e. location or coordinates) of a UE may be obtained via a process where the UE provides measurements of so-called positioning reference signals (PRS) to the network. The network may process such measurements to derive the UE position (such process may be referred as network-based downlink positioning). Alternatively, the UE may itself estimate its own position based on the measurements on PRS, along with location calculation assistance data provided to the UE by the network (such process may be referred as UE-based downlink positioning).

One or more aspects of this disclosure relate to a 3GPP Rel-17 study item on NR Positioning Enhancements (RP-193237, NR Positioning Enhancements, Rel-17 Study Item, December 2019) and in particular to objective 1 copied below:

"Study enhancements and solutions necessary to support the high accuracy (horizontal and vertical), low latency, network efficiency (scalability, RS overhead, etc.), and device efficiency (power consumption, complexity, etc.) requirements for commercial uses cases (incl. general commercial use cases and specifically (I)IoT use cases as exemplified in section 3 above (Justification)):

a. Define additional scenarios (e.g. (I)IoT) based on TR 38.901 to evaluate the performance for the use cases (e.g. (I)IoT). [RAN1]

b. Evaluate the achievable positioning accuracy and latency with the Rel-16 positioning solutions in (I)IoT scenarios and identify any performance gaps. [RAN1]

c. Identify and evaluate positioning techniques, DL/UL positioning reference signals, signalling and procedures for improved accuracy, reduced latency, network efficiency, and device efficiency. [RAN1, RAN2]"

One or more aspects of this disclosure relate to part c of objective 1 and provide network efficiency and improved accuracy.

One or more aspects of this disclosure address the problem of reporting all UE measurements to the network without filtering non-useful measurements.

Specifically, for timing-based methods, such as downlink time difference of arrival (DL-TDoA), there exists the so-called problem of geometric dilution of precision (GDOP). This problem states that the gNBs (or in general, transmission points—TRPs) should not be co-linear with respect to the location of the UE. Otherwise there may be a considerable drop in the positioning accuracy (R. B. Langley, dilution of precision. GPS World, May 1999 and observed time difference of arrival (OTDOA) Positioning in 3GPP LTE, Qualcomm white paper, 2014).

In addition to timing-based methods, angle-based methods are also considerable affected by such collinearity of TRPs with respect to the UEs location. The operation of angle-based methods, such as angle-of-arrival (AoA), is based on the multi-lateration processing of the different reported angles. If such angles are very similar to each other, there may be less degrees of freedom involved thereby reducing the resulting accuracy.

Figure 4:
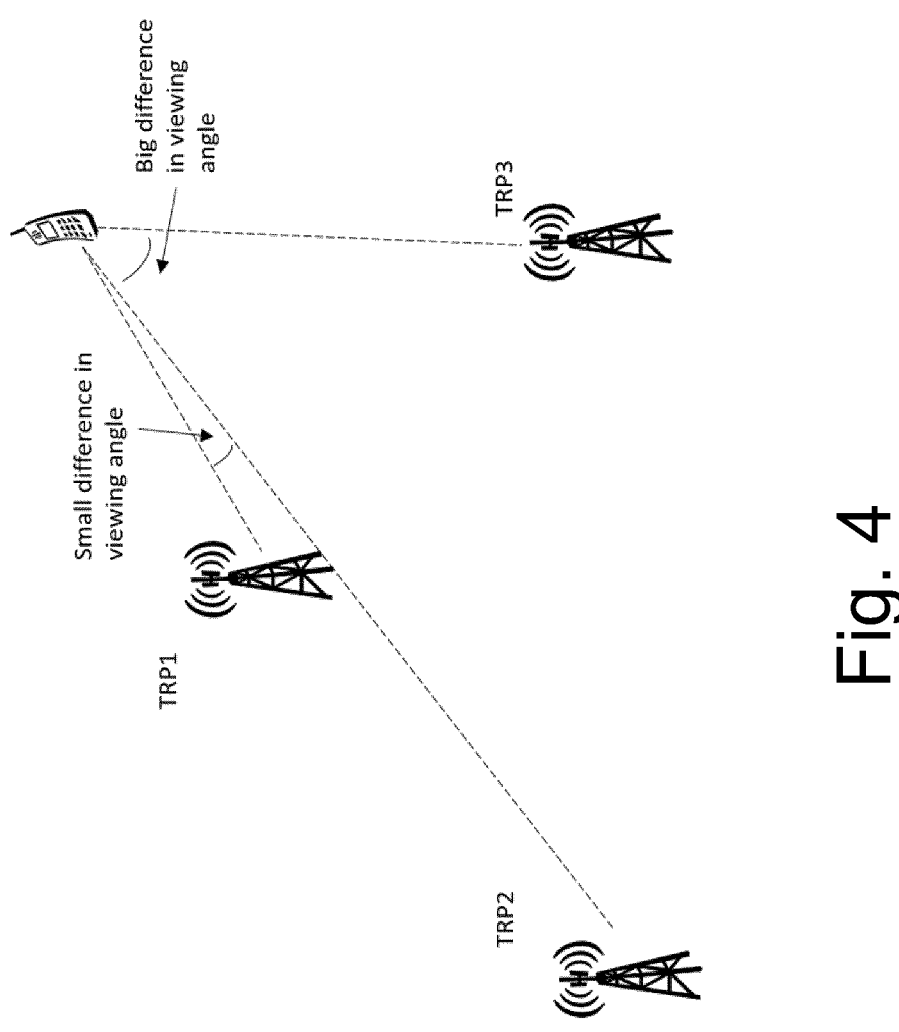
FIG. 4 shows a schematic representation of colinear and non-colinear transmission points as seen at a terminal side.

The problem is illustrated in FIG. 4. TRP1 and TRP2 are not in an attractive relative position with respect to the UE's position, since they are seen from an almost identical viewing angle from the UE. That is, TRP1 and TRP2 are (almost) co-linear, and thus reporting measurements corresponding to this TRP pair would either result in a relative high GDOP (if timing-based methods are used) or in a low resolution of the multilaterated UE position (if angle-based methods are used).

On the contrary, other TRP pairs {TRP1, TRP3} and {TRP2, TRP3} may result in a sufficiently different viewing perspective from the UE side. As a result, the other TRP pairs {TRP1,TRP3} and {TRP2,TRP3} may be included in the downlink positioning process for the UE and for this temporal geometry, since the accuracy of the downlink positioning of the UE is expected to be improved. This is however not the case for combination {TRP1, TRP2}.

There is currently no mechanism in place where the UE checks the relative positions of the TRPs with respect to the UE for selecting the measurements to be reported to the network.

There is currently no mechanism in place where the UE checks the relative DL AoA with respect to the UE for selecting the measurements to be reported to the network.

There may be mechanisms in place where the UE checks the measured signal strength for selecting the measurements to be reported to the network. Typically, in current specifications the UE selects the measurements with the highest received signal strength, yet without considering the incident AoA per TRP or the relative DL AoA per TRP pair with respect to the UE.

One or more aspects of this disclosure provide that in DL positioning the UE may perform filtering/processing onto measured PRSs received from a pair of TRPs before reporting the measured PRSs to the network.

For DL-TDoA the UE may apply filtering before forming and reporting a reference signal time difference (RSTD) based on the measured PRSs for the pair of TRPs. In this way, only the RSTD for a pair of TRPs which is seen from a sufficiently wide angle at the UE side may be included in a RSTD report.

For DL-AoD, the UE may identify a TRP pair which is colinear with respect to the UE and may provide a collinearity indicator indicating a collinearity to the network. This may save processing time at the network. The network may abstain from evaluating the AoD from both TRPs, since in this case processing the AoD from only one TRP may suffice.

A UE may filter measured PRSs received from a pair of TRPs based on a relative DL AoA of the PRSs and may modify a measurement report. The relative DL AoA of the PRSs may be the angle formed by the pair of TRPs and the UE.

For each pair of TRPs belonging to a TRP list provided to the UE by the network via positioning assistance data, the UE may measure, in addition to a configured measurement (e.g., time of arrival (ToA) or reference signal received power—RSRP), the relative DL angle of arrival (AoA) at the UE side.

For DL-TDoA, if the relative DL AoA for a given TRP pair is below a threshold, the UE may abstain from forming and reporting a RSTD for this TRP pair. The UE may inform the network about such TRP pair exclusion from reporting. The threshold may be provided by the network.

For DL-AoD, if the relative DL AoA for a given TRP pair is below a threshold, the UE may inform the network about the collinearity of the TRP pair. For example, the UE may provide a flag message. The threshold may be provided by the network.

The network may configure the UE by means of positioning assistance data to measure the relative DL AoA for each pair of TRPs belonging to a TRP list provided to the UE by the network.

The network may configure the UE on the threshold to be used or filtering out/prioritizing the TRP pairs which are seen as colinear at the UE side.

The network may configure the UE on the flag message to be sent by the UE to inform the network about the collinearity of a TRP pair.

The network may apply a modified processing for extracting the UE coordinates.

For DL-TDoA, the network may only process the RSTD of a pair of TRPs which is indicated as non-colinear by the UE (i.e. a pair of TRPs which is reported by the UE).

For DL-AoD, the network may only process one of the two RSRP reports provided by the UE for a pair of TRPs which is indicated as colinear by the UE. More specifically, for a TRP pair which is indicated as colinear by the UE, the network may only process the strongest RSRP report of the two RSRP reports provided by the UE for a pair of TRPs which is indicated as colinear by the UE in the multi-lateration process for calculating the UE coordinates.

Figure 5:
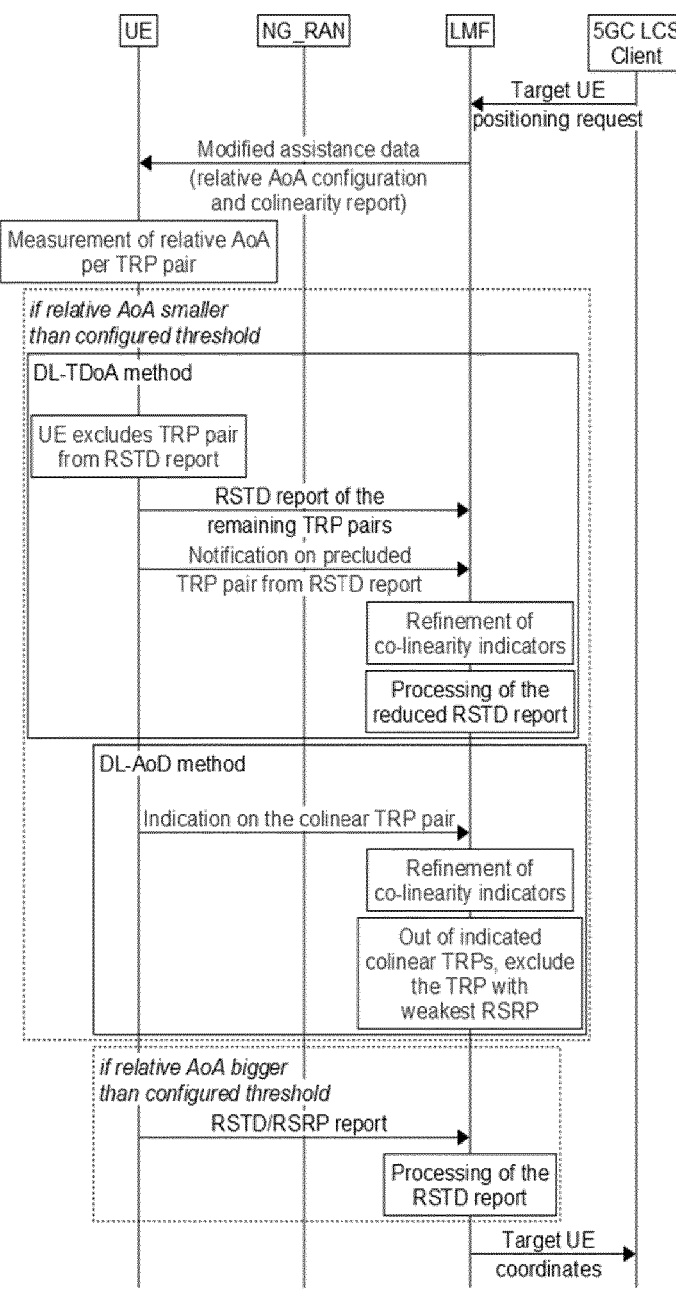
FIG. 5 shows a signal diagram of a process for generating a measurement report based on a collinearity indicator.

The proposed solution results in a modified signalling procedure of the LTE Positioning Protocol (LPP), specified in TS37.355. The signalling steps of the proposed solution are summarized in FIG. 5.

In the following steps performed by the network are described in relation to a LMF but it will be understood that some or all of the following steps may be performed by another network entity.

A LMF may receive a request from a 5GC location service (LCS) client to determine the position of a target UE.

The LMF may provide a collinearity detection configuration to the target UE. The collinearity detection configuration may be provided as part of a assistance data. The configuration may be provided separate from the assistance data, for example after providing the assistance data. The assistance data may comprise a list of TRPs.

The collinearity detection configuration may comprise a relative DL AoA threshold that the target UE should apply to any pair of TRPs that belong to the list of TRPs provided in assistance data. For example, any TRP pair with relative DL AoA smaller than the relative DL AoA threshold is classified with a collinearity indicator indicating a collinearity. Conversely, any TRP pair with relative DL AoA greater than the relative DL AoA threshold is classified with a collinearity indicator indicating a non-collinearity. The LMF may define the relative DL AoA threshold as a function of channel conditions, for example as a function of an estimated signal to interference plus noise ratio (SINR). For example, if the UE estimates a high SINR, then the relative DL AoA has implicitly high trust and thus a tighter relative DL AoA threshold may be applied. Conversely, if the UE estimates a low SINR, then the relative DL AOA has implicitly low trust and thus a looser relative DL AoA threshold may be applied.

It will be understood that the TRP classification is not necessarily binary and the collinearity indicator does not necessarily indicate one of two collinearity values (e.g. discrete collinearity values such as collinearity or non-collinearity). The collinearity indicator may indicate more than two collinearity values (e.g. discrete collinearity values such as high collinearity, medium collinearity or low collinearity or continuous collinearity values such as a collinearity probability in the interval [0, 1] with 1 indicating full certainty of collinearity). The reasoning for such general non-binary classification is to account for measurements errors, for example, due to noise.

The collinearity detection configuration may then comprise more than one relative DL AoA threshold that the target UE should apply to any pair of TRPs that belong to the list of TRPs provided in assistance data. For example, any TRP pair with relative DL AoA smaller than a first relative DL AoA threshold is classified with a collinearity indicator indicating low collinearity by the target UE. Any TRP pair with relative DL AoA smaller than the first relative DL AoA threshold and greater than a second relative DL AoA threshold is classified with a collinearity indicator indicating medium collinearity by the target UE. Any TRP pair with relative DL AoA greater than the second relative DL AoA threshold is classified with a collinearity indicator indicating high collinearity by the target UE.

The UE conducts relative DL AoA measurements for each TRP pair and classify each TRP pair with a collinearity indicator.

For DL-TDoA, if the target UE classifies a pair of TRPs with a collinearity indicator indicating a collinearity or a high collinearity, the target UE may exclude the RSTD of the pair of TRPs from a RSTD report to the LMF. The target UE may notify the LMF that the RSTD of the pair of TRPs was excluded from the RSTD report to the LMF because the UE classified the pair of TRPs with a collinearity indicator indicating a collinearity or a high collinearity If the target UE classifies a pair of TRPs with a collinearity indicator indicating a non-collinearity, a medium collinearity or a low collinearity, the target UE may include the RSTD of the pair of TRPs in the RSTD report to the LMF.

The LMF may optionally refine the collinearity indicator (e.g. in case a low number of RSTD values have been reported).

More specifically, the threshold for classifying a pair of TRPs with a collinearity indicator may be varied. Hence, for cases where not enough pairs of TRPs may classified with a collinearity indicator indicating a non-collinearity, a low-collinearity or a medium collinearity, the LMF may relax the threshold and allow for more RSTD values to be reported. For example, if the threshold for reporting a pair of TRPs is originally set to a 30 degree relative DL AoA as seen at the UE—meaning that only pairs of TRPs with a relative DL AoA above 30 degree are reported—this threshold may be optionally modified to, as an example, a 20 degree relative DL AoA to allow for more RSTD values to be reported.

Such refinement may optionally be followed by an update on the collinearity detection configuration to the target UE. The LMF may provide the relaxed threshold to the target UE. The LMF may use the collinearity indicators to generate a TRP priority list to be later used in a faster/lower overhead positioning session.

The LMF may calculate the target UE coordinates based on the set of RSTD per pair of TRPs in the RSTD report.

For DL-AoD, the target UE may include the RSRPs of each pair of TRPs in a RSRP report to the LMF. The target UE may also include a collinearity indicator for each pair of TRPs in the RSRP report to the LMF.

The LMF may optionally refine the collinearity indicator (e.g. in case a low number of RSTD values have been reported).

For each TRP pair with a collinearity indicator indicating a non-collinearity or a low collinearity the LMF may select both RSRPs of the TRP pair to estimate the AoD of both TRPs of the TRP pair.

For each TRP pair with a collinearity indicator indicating a collinearity a medium collinearity or a high collinearity the LMF may only select the strongest RSRP of the TRP pair to estimate the AoD of only one TRP of the TRP pair.

The LMF may calculate the coordinates of the UE based on the estimated AoD of the above subset of TRPs.

Figure 6:
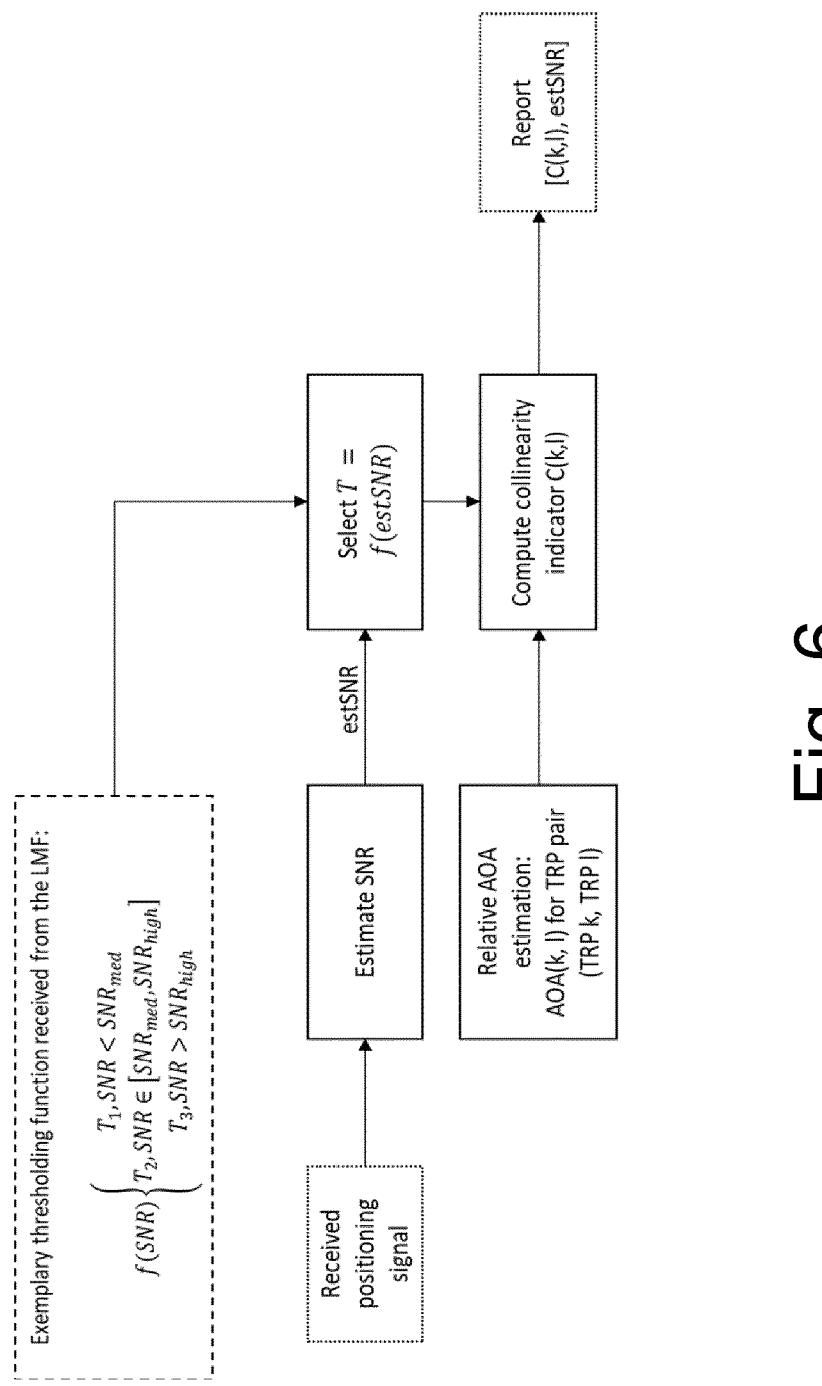
FIG. 6 shows a block diagram of a method for generating a measurement report based on a collinearity indicator, wherein the collinearity indicator is determined based on a threshold selected based on channel conditions.

FIG. 6 shows a block diagram of a process for generating a measurement report based on a collinearity indicator.

A UE may receive a PRS from each TRP of a pair of TRPs.

The UE may estimate channel conditions based on the received PRSs. For example, the UE may estimate a SINR based on measurements of the received PRSs.

The UE may select one or more relative DL AoA thresholds based on the estimated channel conditions. Alternatively or additionally, the UE may select one or more relative DL AoA thresholds based on estimated noise and interference conditions.

The UE may estimate a relative DL AoA for the pair of TRPs based on the measurements of the received PRSs.

The UE may compute a collinearity indicator based on the estimated relative DL AoA and the selected one or more relative DL DL AoA thresholds.

The UE may generate a measurement report based on the collinearity indicator.

The above method may be repeated for each pair of TRPs within the list of TRPs indicated in the assistance data.

In an implementation the collinearity indicator may comprise more than two values and may indicate low collinearity, medium collinearity or high collinearity. The LMF may refine the collinearity indicator for all TRP pairs that have a medium collinearity and/or a high collinearity level, thereby deciding on which TRP pairs are colinear (accounting thus for measurement errors at the UE).

In an implementation the procedure may be applied to a pair of transmission beams of a pair of TRPs. In such implementation, the UE may determine and/or report beam collinearity indicators. The beam collinearity indicators may then be distributed by the LMF (after being optionally/additionally refined) to the pair of TRPs, for example via the NRPPa protocol. The beam collinearity indicators may be used by the pair of TRPs to adjust the pair of transmission beams, for example the reach/transmission power of the pair of transmission beams.

Figure 7:
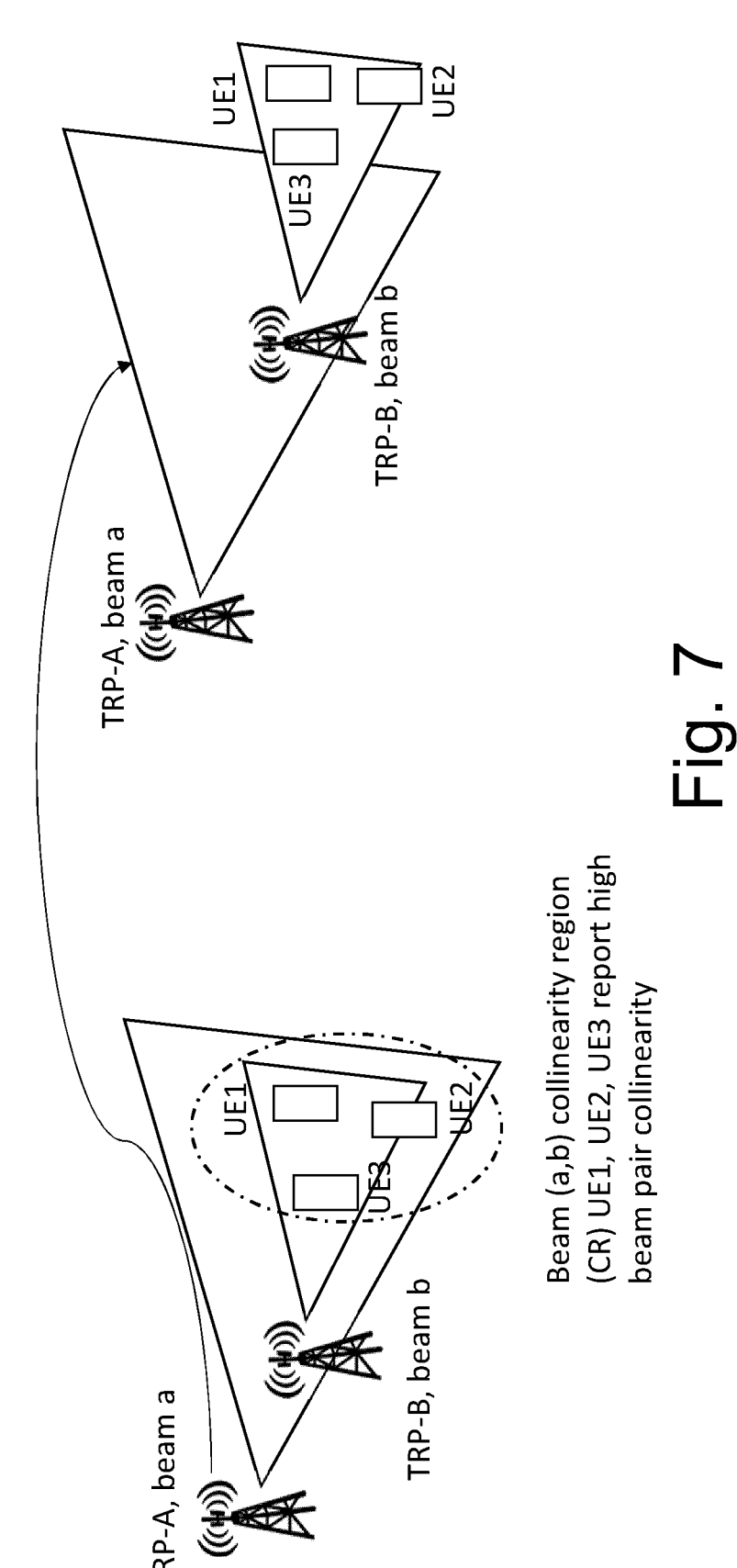
FIG. 7 shows a schematic representation of transmission points with colinear transmission beams adjusting the transmission power of their transmission beams.

FIG. 7 shows an example wherein a beam-a of TRP-A and beam-b of TRP-B are being reported by one or more UEs as having a beam collinearity indicator indicating a collinearity or a high collinearity. TRP-A and/or TRP-B may decide on a beam pair configuration to decrease a beam collinearity region (CR) while improving coverage. One exemplary strategy is for one of the TRPs (e.g. TRP-A) to reduce the reach/transmission power of its transmission beam (e.g. of beam a) so that CR is not covered by both beams anymore.

This implementation allows a reduction of "wasted" UE-specific PRS (i.e. that network avoids UE-specific PRS transmissions to a UE from a pair of transmission beams of a pair of TRPs which are identified to be colinear with respect to the UE being at a given time/location).

One or more aspects of this disclosure provide one or more advantages. In DL-TDoA, the proposed solution provides a quick approach at the UE side to identify that some TRP pairs should not be reported to the network, since if reported it would not add constructively to the positioning accuracy of the UE. The proposed solution simplifies the DL-AoD process by assisting the LMF with a collinearity indication, thereby informing the LMF that only one of the two TRPs out of the given TRP pair should be processed. When DL-AoD is used, the proposed solution contributes towards higher network efficiency on positioning by reducing the processing at the LMF. When DL-TDoA is used, the proposed solution contributes towards higher accuracy by overpassing TRP pairs associated with high GDOP. Since the UE reports a reduced set of PRS measurements, the UL signaling overhead is also reduced.

Figure 8:
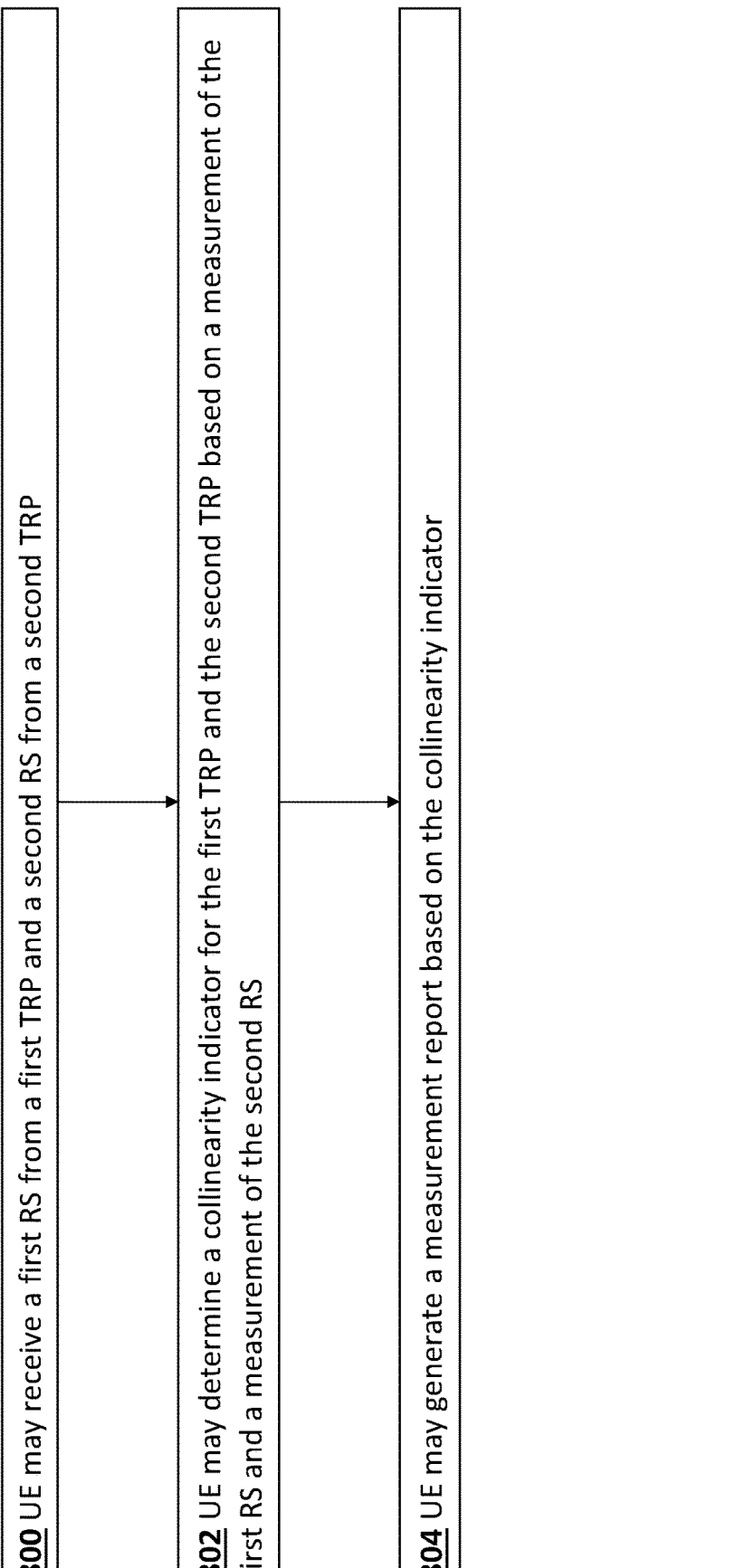
FIG. 8 shows a block diagram of a method for generating a measurement report based on a collinearity indicator performed, for example, by a terminal.

FIG. 8 shows a block diagram of a method for generating a measurement report based on a collinearity indicator performed, for example, by a terminal (e.g. UE).

The UE may receive a collinearity detection configuration from a network function (e.g. LMF). For example, the UE may receive: receive the at least one threshold from a network function. [The at least one threshold may be a function of channel conditions.

In step 800 the UE may receive a first RS from a first TRP and a second RS from a second TRP.

In step 802 the UE may determine a collinearity indicator for the first TRP and the second TRP based on a measurement of the first RS and a measurement of the second RS.

Determining a collinearity indicator for the first TRP and the second TRP based on a measurement of the first RS and a measurement of the second RS may comprise: determining a relative DL AoA of the first RS and the second RS based on the measurement of the first RS and the measurement of the second RS; comparing the relative DL AoA of the first RS and the second RS at least one threshold; and determining the collinearity indicator for the first TRP and the second TRP based on the comparing.

The collinearity indicator may indicate one of a collinearity or a non-collinearity. The collinearity indicator indicates one of a plurality of collinearity values.

In step 804 the UE may generate a measurement report based on the collinearity indicator.

Generating a measurement report based on the collinearity indicator may comprise: including a RSTD based on the measurement of the first RS and the measurement of the second RS in the measurement report, when the collinearity indicator indicates a non-collinearity or a collinearity value lower than a threshold; and/or excluding a RSTD based on the measurement of the first RS and the measurement of the second RS in the measurement report, when the collinearity indicator indicates a collinearity or a collinearity value greater than a threshold.

The UE may inform the network function that the RSTD based on the measurement of the first RS and the measurement of the second RS has been excluded from the measurement report, when the collinearity indicator indicates a collinearity or a collinearity value greater than a threshold.

Generating a measurement report based on the collinearity indicator may comprise: including both the measurement of the first RS and the measurement of the second RS in the measurement report, when the collinearity indicator indicates a non-collinearity or a collinearity value lower than a threshold; and/or including both the measurement of the first RS and the measurement of the second RS in the measurement report, when the collinearity indicator indicates a collinearity or a collinearity value greater than a threshold.

Generating a measurement report based on the collinearity indicator may comprise: including the collinearity indicator in the measurement report, when the collinearity indicator indicates a non-collinearity or a collinearity value lower than a threshold; and/or including the collinearity indicator in the measurement report, when the collinearity indicator indicates a collinearity or a collinearity value greater than a threshold.

The UE may provide the measurement report to the network function.

In an implementation, the UE may receive the first RS transmitted from the first TRP via a first TX beam and the second RS transmitted from the second TRP via a second TX beam. The UE may determine the collinearity indicator for the first TX beam of the first TRP and the second TX beam of the second TRP based on the measurement of the first RS and the measurement of the second RS. The UE may generate the measurement report based on the collinearity indicator.

FIG. 9 shows a block diagram of a method for receiving a measurement report based on a collinearity indicator performed, for example, by a network function (e.g. LMF).

The LMF may provide, to the terminal, a collinearity detection configuration. For example, the LMF may provide, to the terminal, at least one threshold to determine the collinearity indicator. The at least one threshold may be a function of channel conditions.

In step 900, the LMF may receive, from a terminal (e.g. UE), a measurement report based on a collinearity indicator for a first TRP and a second TRP. The collinearity indicator is determined by the terminal based on a measurement of a first RS signal from the first TRP and a measurement of a second RS from the second TRP.

The collinearity indicator may indicate one of a collinearity or a non-collinearity. The collinearity indicator may indicate one of a plurality of collinearity values.

The measurement report may include a RSTD based on the measurement of the first RS and the measurement of the second RS, when the collinearity indicator indicates a non-collinearity or a collinearity value lower than a threshold. The measurement report may exclude a RSTD based on the measurement of the first RS and the measurement of the second RS in the measurement report, when the collinearity indicator indicates a collinearity or a collinearity value greater than a threshold.

The LMF may be informed, by the terminal, that the RSTD based on the measurement of the first RS and the measurement of the second RS has been excluded from the measurement report, when the collinearity indicator indicates a collinearity or a value greater than a threshold.

The measurement report may include both the measurement of the first RS and the measurement of the second RS, when the collinearity indicator indicates a non-collinearity or a collinearity value lower than a threshold. The measurement report may include both the measurement of the first RS and the measurement of the second RS in the measurement report, when the collinearity indicator indicates a collinearity or a collinearity value greater than a threshold.

The measurement report may include the collinearity indicator in, when the collinearity indicator indicates a non-collinearity or a value lower than a threshold. The measurement report may include the collinearity indicator, when the collinearity indicator indicates a collinearity or a collinearity value greater than a threshold.

The LMF may determine a position of the terminal based on the measurement report.

Determining a position of the terminal based on the measurement report may comprise: determining a position of the terminal based on the RSTD based on the measurement of the first RS and the measurement of the second RS.

Determining a position of the terminal based on the measurement report may comprise: determining an AoD for the first TRP and an AoD for the second TRP, when the collinearity indicator indicates a non-collinearity a collinearity value lower than a threshold.

Determining a position of the terminal based on the measurement report may comprise: determining an AoD for the first TRP, when the collinearity indicator indicates a collinearity or a collinearity value greater than a threshold and the measurement of the first RS al is indicated as the strongest measurement in the measurement report.

Determining a position of the terminal based on the measurement report may comprise: determining an AoD for the second TRP, when the collinearity indicator indicates a collinearity or a collinearity value greater than a threshold and the measurement of the second RS is indicated as the strongest measurement in the measurement report.

Determining a position of the terminal based on the measurement report may comprise: determining a position of the terminal based on the AoD for the first TRP and/or the AoD for the second TRP.

In an implementation, the LMF may receive, from the terminal, the measurement report based on a collinearity indicator for a first TX beam of a first TRP and a second TX beam of a second TRP. The collinearity indicator may be determined by the terminal based on a measurement of the first RS transmitted by the first TRP via the first TX beam and a measurement of the second RS transmitted by the second TRP via the second TX beam.

The LMF may provide, to the first TRP and/or the second TRP, the collinearity indicator to cause the first TRP to adjust the first TX beam and/or the second TRP to adjust the second TX beam.

Figure 10:
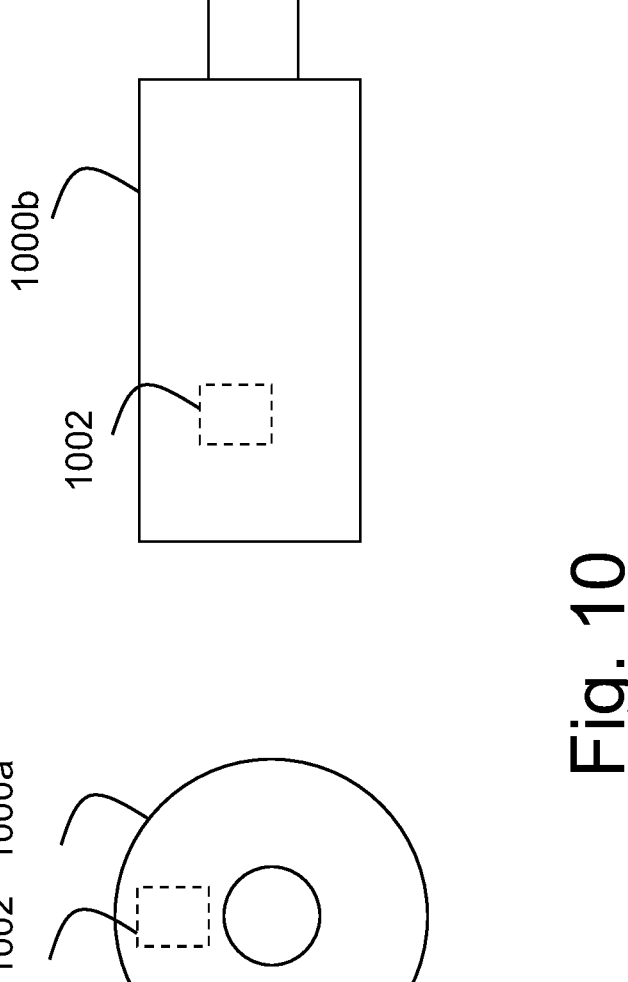
FIG. 10 shows a schematic representation of a non-volatile memory medium storing instructions which when executed by a processor allow a processor to perform one or more of the steps of the methods of FIGS. 8 and 9.

FIG. 10 shows a schematic representation of non-volatile memory media 1000a (e.g. computer disc (CD) or digital versatile disc (DVD)) and 1000b (e.g. universal serial bus (USB) memory stick) storing instructions and/or parameters 1002 which when executed by a processor allow the processor to perform one or more of the steps of the methods of FIGS. 8 and 9.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 8 and 9, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus, comprising:

at least one processor; and at least one non-transitory memory storing instructions that, when executed with the at least one processor, cause the apparatus at least to:

receive, from a network function as positioning assistance data, a collinearity detection configuration comprising at least one relative downlink angle-of-arrival (AoA) threshold;

receive a first reference signal from a first transmission point and a second reference signal from a second transmission point, the first transmission point and the second transmission point being a pair of transmission points in a transmission-point list included in the positioning assistance data;

determine a collinearity indicator for the first transmission point and the second transmission point by:

determining a relative downlink angle of arrival of the first reference signal and the second reference signal based on a measurement of the first reference signal and a measurement of the second reference signal;

selecting the at least one relative downlink AoA threshold based on channel conditions comprising an estimated signal-to-interference-plus-noise ratio (SINR);

comparing the relative downlink angle of arrival to the selected threshold; and determining the collinearity indicator based on the comparing, wherein the collinearity indicator comprises one of a collinearity or non-collinearity, or one of a plurality of collinearity values; and for a downlink time-difference-of-arrival (DL-TDoA) positioning measurement, generate a measurement report based on the collinearity indicator by:

excluding a reference signal time difference based on the measurement of the first reference signal and the measurement of the second reference signal from the measurement report when the collinearity indicator indicates the collinearity or a collinearity value of the plurality of collinearity values is greater than the selected threshold, and informing a network function that the reference signal time difference has been excluded based on the collinearity value.

2. The apparatus of claim 1, wherein the instructions, when executed with the at least one processor, cause the apparatus to perform at least one of:

including the collinearity indicator in the measurement report, when the collinearity indicator indicates the non-collinearity or the collinearity value lower than the at least one threshold; or including the collinearity indicator in the measurement report, when the collinearity indicator indicates the collinearity or the collinearity value greater than the at least one threshold.

3. An apparatus, comprising:

at least one processor; and at least one non-transitory memory storing instructions that, when executed with the at least one processor, cause the apparatus at least to:

provide, to a terminal, at least one threshold to determine a collinearity indicator;

receive, from the terminal, a measurement report based on the collinearity indicator for a first transmission point and a second transmission point, wherein the collinearity indicator is determined by the terminal by comparing a relative downlink angle of arrival of a first reference signal from the first transmission point and a second reference signal from the second transmission point to the at least one threshold, wherein the at least one threshold is selected based on an estimated signal to interference plus noise ratio (SINR); and determine a position of the terminal based on the measurement report by performing at least one of:

determining an angle of departure for the first transmission point and an angle of departure for the second transmission point, when the collinearity indicator indicates a non-collinearity, or a collinearity value lower than the at least one threshold;

determining the angle of departure for the first transmission point, when the collinearity indicator indicates the collinearity or the collinearity value greater than the at least one threshold and a measurement of the first reference signal is indicated as the strongest measurement in the measurement report; or determining an angle of departure for the second trans- mission point, when the collinearity indicator indi- cates the collinearity or the collinearity value greater than the at least one threshold and a measurement of the second reference signal is indicated as the stron- gest measurement in the measurement report.

4. The apparatus of claim 3, wherein determining the position of the terminal based on the measurement report further comprises determining the position of the terminal based on a reference signal time difference based on the measurement of the first reference signal and the measure- ment of the second reference signal.

5. The apparatus of claim 3, wherein the instructions, when executed with the at least one processor, cause the apparatus at least to:

receive, from the terminal, the measurement report based on the collinearity indicator for a first transmission beam of the first transmission point and a second transmission beam of the second transmission point, wherein the collinearity indicator is determined with the terminal based on a measurement of the first reference signal transmitted with the first transmission point with the first transmission beam and a measure- ment of the second reference signal transmitted with the second transmission point with the second trans- mission beam.

6. The apparatus of claim 5, wherein the instructions, when executed with the at least one processor, cause the apparatus at least to:

provide, to at least one of the first transmission point or the second transmission point, the collinearity indicator to cause the first transmission point to adjust at least one of the first transmission beam or the second trans- mission point to adjust the second transmission beam.

7. A method comprising:

receiving, from a network function as positioning assis- tance data, a collinearity detection configuration com- prising at least one relative downlink angle-of-arrival (AoA) threshold;

receiving a first reference signal from a first transmission point and a second reference signal from a second transmission point, the first transmission point and the second transmission point being a pair of transmission points in a transmission-point list included in the posi- tioning assistance data;

determining a collinearity indicator for the first transmis- sion point and the second transmission point by:

determining a relative downlink angle of arrival of the first reference signal and the second reference signal based on a measurement of the first reference signal and a measurement of the second reference signal;

selecting the at least one relative downlink AoA thresh- old based on channel conditions comprising an esti- mated signal-to-interference-plus-noise ratio (SINR);

comparing the relative downlink angle of arrival to the selected threshold; and determining the collinearity indicator based on the comparing, wherein the collinearity indicator com- prises one of a collinearity or non-collinearity, or one of a plurality of collinearity values; and for a downlink time-difference-of-arrival (DL-TDoA) positioning measurement, generate a measurement report based on the collinearity indicator by:

excluding a reference signal time difference based on the measurement of the first reference signal and the measurement of the second reference signal from the measurement report when the collinear- ity indicator indicates the collinearity or a col- linearity value of the plurality of collinearity val- ues is greater than the selected threshold, and informing a network function that the reference signal time difference has been excluded based on the collinearity value.

\*   \*   \*   \*   \*